(12) United States Patent
Morooka et al.

(10) Patent No.: US 7,102,783 B2
(45) Date of Patent: Sep. 5, 2006

(54) PRINTING DATA PROCESSING APPARATUS AND METHOD

(75) Inventors: Hidekazu Morooka, Kanagawa (JP); Shigeki Kuroda, Kanagawa (JP); Makoto Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 836 days.

(21) Appl. No.: 10/238,649

(22) Filed: Sep. 11, 2002

(65) Prior Publication Data

US 2003/0053129 A1   Mar. 20, 2003

(30) Foreign Application Priority Data

Sep. 14, 2001   (JP) .............................. 2001-280611

(51) Int. Cl.
*G06F 13/10* (2006.01)
(52) U.S. Cl. ..................... 358/1.15; 709/201; 709/203; 707/102; 395/114; 358/1.18
(58) Field of Classification Search ............... 358/1.15; 709/201, 202, 203; 395/114; 707/102
See application file for complete search history.

(56) References Cited

U.S. PATENT DOCUMENTS

| | | | | |
|---|---|---|---|---|
| 5,564,109 A | * | 10/1996 | Snyder et al. ............. | 710/8 |
| 5,699,495 A | * | 12/1997 | Snipp ........................ | 358/1.15 |
| 5,982,996 A | * | 11/1999 | Snyders ..................... | 358/1.15 |
| 6,349,304 B1 | * | 2/2002 | Boldt et al. ................ | 707/102 |
| 6,757,070 B1 | * | 6/2004 | Lin et al. .................... | 358/1.1 |
| 6,762,852 B1 | * | 7/2004 | Fischer ...................... | 358/1.15 |
| 6,952,831 B1 | * | 10/2005 | Moore ........................ | 719/327 |

FOREIGN PATENT DOCUMENTS

| | | |
|---|---|---|
| JP | 7-175605 | 7/1995 |
| JP | 8-286854 | 11/1996 |
| JP | 10-105349 | 4/1998 |
| JP | 11-232054 | 8/1999 |
| JP | 2001-134406 | 5/2001 |
| JP | 2001-1956166 | 7/2001 |

* cited by examiner

*Primary Examiner*—Twyler M. Lamb
*Assistant Examiner*—Robert N. Kang
(74) *Attorney, Agent, or Firm*—Fitzpatrick, Cella, Harper & Scinto

(57) ABSTRACT

A client computer has a group printer driver which provides an interface as one printer driver by comprehensively managing a plurality of registered member printer drivers. This group printer driver provides a setting user interface for comprehensively setting setting items in the printer drivers, and a designating user interface for designating a desired one of these printer drivers. When a member printer driver is designated on the designating user interface, the individual user interface of the designated member printer driver is presented to make it possible to set individual items. This provides a user interface capable of efficiently and easily setting functions of a plurality of printers.

10 Claims, 17 Drawing Sheets

FIG. 13

| SETTING ITEMS |
|---|
| LOGICAL SHEET SIZE |
| OUTPUT SHEET SIZE |
| USER DEFINED SHEET |
| PRINTING ORIENTATION |
| MARGIN |
| MAGNIFICATION |
| NUMBER OF COPIES |
| COPY UNIT (GROUP, COLLATE) |
| SORT (NON-COLLATE) |
| PAGE LAYOUT |
| ARRANGEMENT |
| DOUBLE-SIDED/SINGLE-SIDED |
| RESOLUTION |
| GRAY SCALE |
| ROTATION |
| WATERMARK |
| PAGE OPTION |
| BINDING DIRECTION |
| BINDING MARGIN |
| STAPLE |
| STAPLE POSITION |
| SADDLE (BOOKBINDING PRINTING) |
| SADDLE UPPER-LIMIT NUMBER OF COPIES |
| METHOD OF BOOKBINDING PRINTING |
| OPENING DIRECTION |
| BOOKBINDING MARGIN |
| LOWER-LIMIT VALUE OF BOOKBINDING MARGIN |
| PUNCH |
| Z-FOLD |
| 4-SIDED POSTCARD |
| SHEET MIXING |
| INSERTER |
| PAPER FEED METHOD |
| PAPER FEED UNIT |

FIG. 14

| FUNCTION | PRINTER DRIVER B | PRINTER DRIVER C | PRINTER DRIVER D | PRINTER DRIVER A |
|---|---|---|---|---|
| BOOKBINDING PRINTING FUNCTION | SUPPORTED | NOT SUPPORTED | SUPPORTED | NOT SUPPORTED |
| STAPLE FUNCTION | SUPPORTED | SUPPORTED | SUPPORTED | SUPPORTED |
| PUNCH FUNCTION | NOT SUPPORTED | NOT SUPPORTED | NOT SUPPORTED | NOT SUPPORTED |

PRINTING DATA PROCESSING APPARATUS AND METHOD

FIELD OF THE INVENTION

The present invention relates to a printing control apparatus and method of printing data in accordance with a drawing command from an application, a control program for allowing a computer to execute printing data processing, and a computer-readable storage medium storing the control program.

BACKGROUND OF THE INVENTION

Recently, network apparatuses are generally used, and many personal computers (PCs) and printers are connected to networks. In this printing environment, printing methods such as distributed printing and broadcast printing which use a plurality of printers are known. For example, in distributed printing, a print job is divided into predetermined page ranges and printed by a plurality of printers. In broadcast printing, each of a plurality of printers is assigned printing of a predetermined number of copies, and the printing processes by these printers are performed in parallel to obtain a plurality of copies as printing output for a single job.

A plurality of printers used in the printing environment explained above sometimes have different characteristics (setting items). To set these printers having different characteristics, it is necessary to individually set the printers via user interfaces provided by printer drivers corresponding to the printers. A setting method which sets standardized contents for a plurality of printers is also proposed.

Unfortunately, in the above-mentioned conventional setting method which sets standardized contents, many inconveniences occur because conflicts between the characteristics of a plurality of printers (disagreements between settable functions of a plurality of printers) are not taken into consideration.

Additionally, printing setting for a plurality of printer drivers presumably has items which can be set more efficiently when individually set for these printer drivers than when collectively set at once. However, the conventional method does not assume printing setting like this. Furthermore, items to be individually set for a plurality of printer drivers must always be individually set in the conventional method.

The setting user interfaces of a plurality of member printer drivers can also be integrated into a single user interface and displayed in a settable manner. However, this leads to an increase in the setting items and may confuse the users.

As described above, no prior art can provide a setting environment in which a user can efficiently set items as many as possible for each of a plurality of printers. That is, although several methods have been proposed as a method of setting the contents of a plurality of member printer driver UIs by one printer driver UI, no setting method is more efficient than the method of performing setting by using individual member printer driver UIs.

SUMMARY OF THE INVENTION

The present invention has been made to solve the above problem, and has as its object to provide a user interface which can efficiently and easily set functions for a plurality of printers.

According to the present invention, the foregoing object is attained by providing a printing data processing apparatus for processing printing data by providing an interface as one virtual printer driver by comprehensively managing a plurality of registered printer drivers, comprising: first providing means for providing a setting user interface for comprehensively setting setting items in the plurality of printer drivers; second providing means for providing a designating user interface for designating a desired one of the plurality of printer drivers; and control means for presenting an individual user interface of a printer driver designated by the designating user interface in order to set the designated printer driver.

According to another aspect of the present invention, the foregoing object is attained by providing a printing data processing method of processing printing data by providing an interface as one virtual printer driver by comprehensively managing a plurality of registered printer drivers, comprising: the first providing step of providing a setting user interface for comprehensively setting setting items in the plurality of printer drivers; the second providing step of providing a designating user interface for designating a desired one of the plurality of printer drivers; and the control step of presenting an individual user interface of a printer driver designated by the designating user interface in order to set the designated printer driver.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a view showing examples of setting items which a group printer driver 603 inquires in step S9-3;

FIG. 14 is a view for explaining function conflict processing;

DETAILED DESCRIPTION OF THE PREFERRED EMBODIMENT

A preferred embodiment of the present invention will now be described in detail in accordance with the accompanying drawings.

Figure 1:
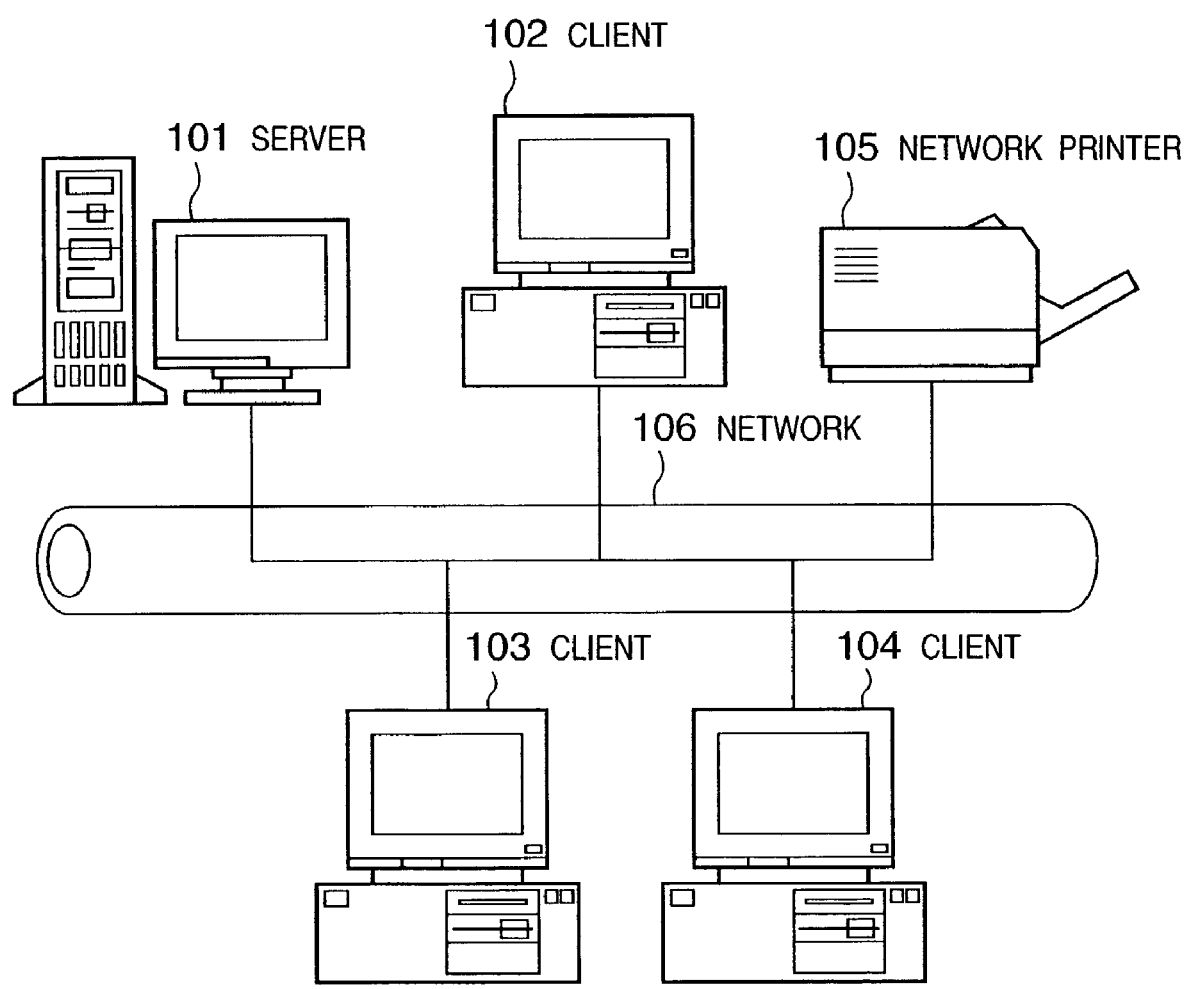
FIG. 1 is a block diagram for explaining the configuration of an information processing system to which the present invention is applicable.

FIG. 1 is a block diagram for explaining the configuration of an information processing system to which the present invention is applicable. In this system, one or a plurality of client computers are connected.

Referring to FIG. 1, reference numerals 102, 103, and 104 denote information processing apparatuses (to be referred to as client computers hereinafter) as clients. These client computers 102, 103, and 104 are connected to a network 106 by a network cable such as Ethernet (registered trademark), and can execute various programs such as application programs. Each client has a printer driver capable of converting printing data into a printer language corresponding to the printer. Note that this system supports a plurality of printer drivers. That is, a plurality of printers can be registered in the system, and member printer drivers can be those provided by a plurality of manufacturers.

Reference numeral 101 denotes an information processing apparatus (to be referred to as a print server hereinafter) as a server of this embodiment. This print server 101 is connected to the network 106 by the network cable to store files to be used in the network 106 and monitor the use state of the network 106. The print server 101 manages a plurality of printers connected to the network 106.

Note that the client computers 102 to 104 and print server 101 are general information processing apparatuses, and printing control programs for performing different control operations are stored in an executable manner in each client computer and the print server. The print server 101 can also have the function as a client at the same time.

The print server 101 of this embodiment further has the following functions. That is, the print server 101 (1) stores and prints out print jobs containing printing data and output from the client computers 102, 103, and 104; (2) receives job information not containing printing data from the client computers 102, 103, and 104, manages the printing order of these client computers 102, 103, and 104, and notifies permission of transmission of a print job containing printing data to a client whose turn has come; and (3) acquires various kinds of information such as the status and print jobs of a network printer 105, and notifies the client computers 102, 103, and 104 of the acquired information.

Reference numeral 105 denotes a network printer as a printing controller which is connected to the network 106 via a network interface (not shown). This network printer 105 receives across the network 106 a print job containing printing data and transmitted from a client computer, analyzes the print job and converts it into dot images page by page, and prints the images page by page. The network 106 connects the client computers 102, 103, and 104, server 101, network printer 105, and the like.

Figure 2:
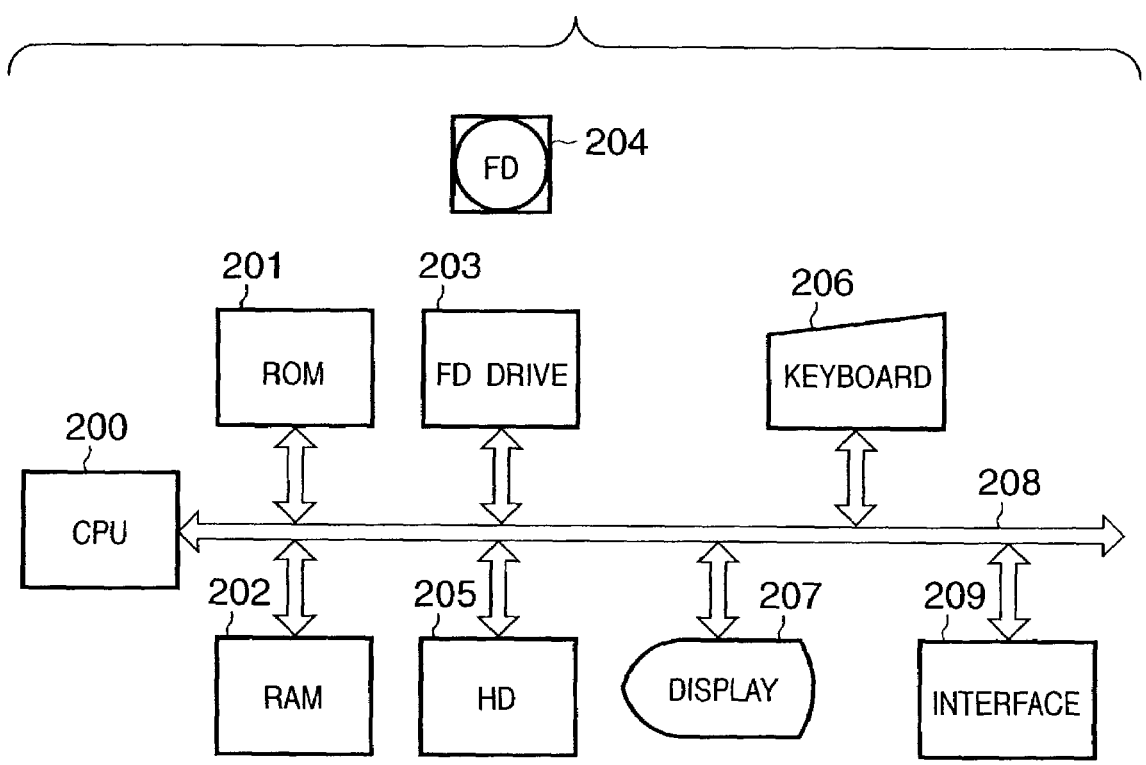
FIG. 2 is a block diagram for explaining the arrangement of an information processing apparatus of this embodiment.

FIG. 2 is a block diagram for explaining the arrangement of the information processing apparatus of this embodiment. The client computers 102, 103, and 104 are information processing apparatuses and each have the arrangement shown in FIG. 2. Also, the print server 101 has a hardware configuration similar to or equivalent to the arrangement shown in FIG. 2. In the following description, therefore, FIG. 2 will be explained as a block diagram which explains the configurations of both the client and server.

Referring to FIG. 2, reference numeral 200 denotes a CPU as a control means of the information processing apparatus. This CPU 200 executes, e.g., an application program, printer driver program, OS, and network printer control program of this embodiment stored in a hard disk (HD) 205. The CPU 200 also temporarily stores information necessary to execute programs, files, and the like in a RAM 202.

A ROM 201 as a storage means stores programs such as a basic I/O program and various data such as font data and template data used in document processing. The RAM 202 as a temporary storage means functions as, e.g., a main memory and work area of the CPU 200.

Figure 5:
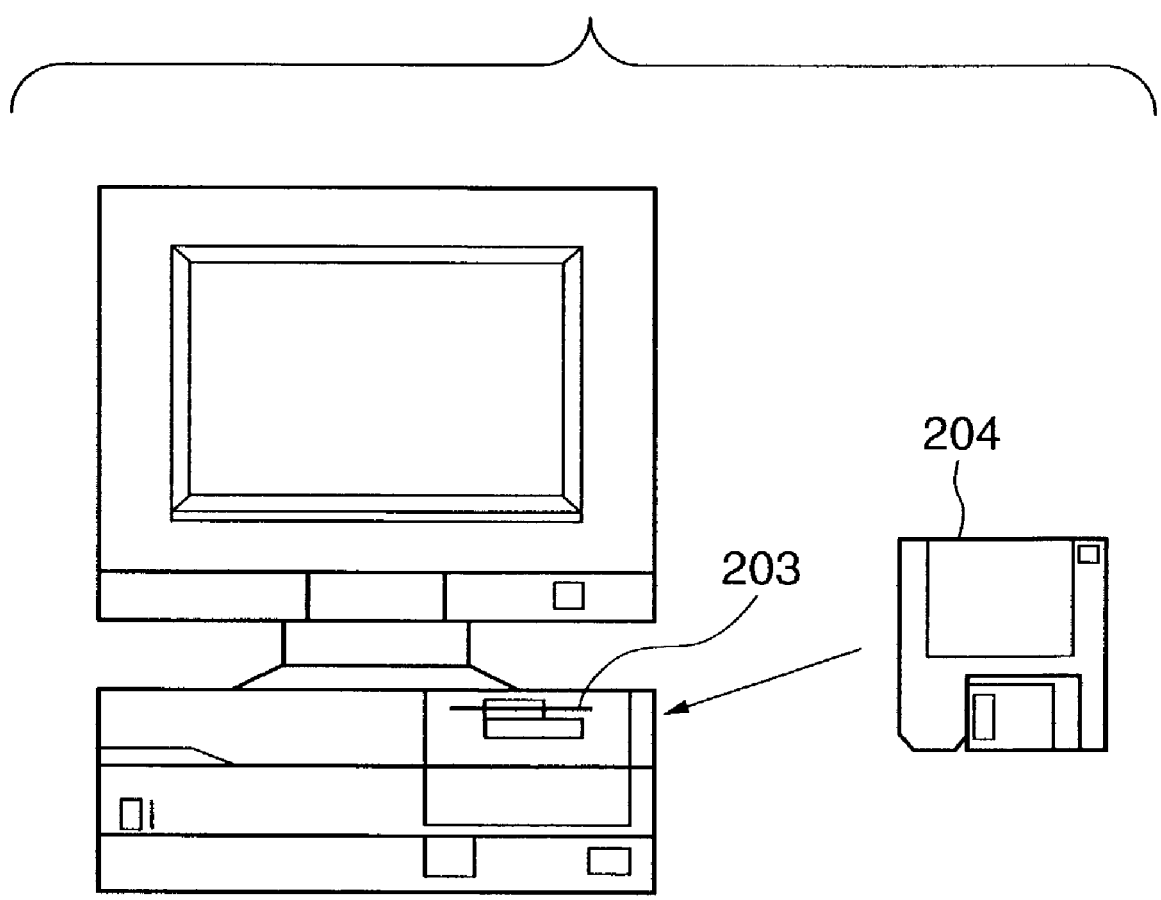
FIG. 5 is a view showing the FD 204 inserted into an FD drive 203 shown in FIG. 2.

Reference numeral 203 denotes a floppy (registered trademark) disk (FD) drive as a storage medium reading means. As shown in FIG. 5 (to be described later), a program and the like stored in an FD 204 as a storage medium can be loaded into this computer system via the FD drive 203. Note that the storage medium need not be an FD but can be any of, e.g., a CD-ROM, CD-R, CD-RW, PC card, DVD, IC memory card, MO, and memory stick. The floppy disk 204 is a storage medium storing a computer-readable program.

Reference numeral 205 denotes a hard disk (HD) which is an external storage means and functions as a large-capacity memory. This HD 205 stores an application program, printer driver program, OS, network printer control program, related program, and the like. A spooler as a spooling means is also stored in this HD 205. The spooling means is a client spooler in each client and a server spooler in the print server. In the print server, a table for storing job information received from the clients and performing sequence control is also stored in this external storage means.

Reference numeral 206 denotes a keyboard as an instruction input means. From a user to each client computer, or from an operator or manager to the print server, a command such as a device control command is input by this keyboard 206. A display 207 as a display means displays a command input from the keyboard 206, the status of the printer, and the like. A system bus 208 allows data to flow in computers as the clients and print server. Reference numeral 209 denotes an interface as an input/output means via which the information processing apparatus exchanges data with an external apparatus. This interface 209 is, e.g., a network interface, and connects the network 106 and the system bus 208.

Figure 3:
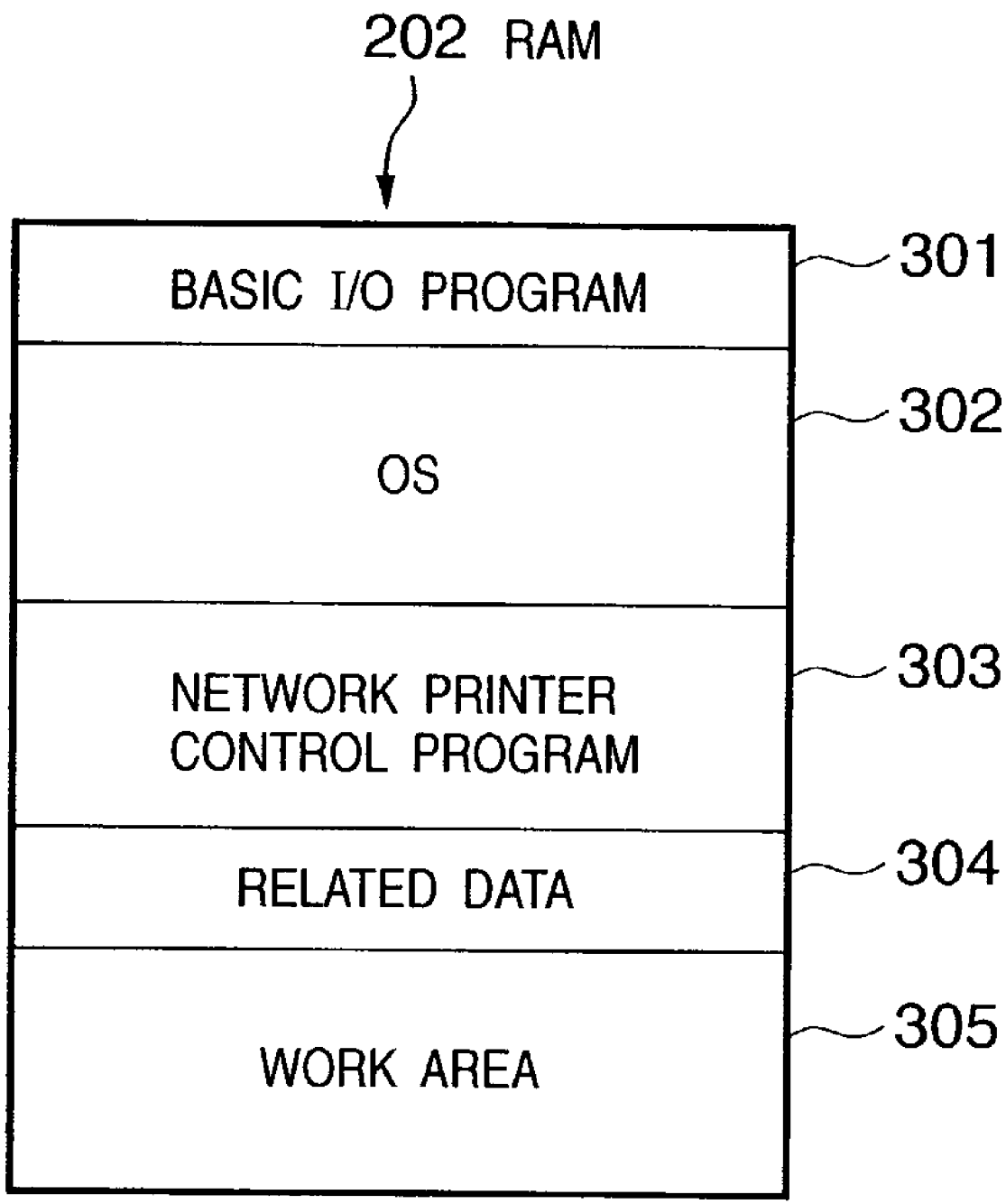
FIG. 3 is a view showing an example of a memory map in a RAM 202 shown in FIG. 2.

FIG. 3 is a view showing an example of a memory map in the RAM 202 shown in FIG. 2. This is a memory map when the network printer control program is loaded into the RAM 202 from the FD 204 and made executable. In this embodiment, the network printer control program and related data are loaded from the FD 204 directly into the RAM 202. However, whenever the network printer control program is operated, this network printer control program can be loaded from the HD 205, in which the control program is installed, into the RAM 202.

Also, the medium storing this network printer control program can be a CD-ROM, CD-R, PC card, DVD, or IC memory card, as well as an FD. Furthermore, this network printer control program can be stored in the ROM 201 to form part of the memory map and directly executed by the CPU 200. Alternatively, software which implements functions equal to those of the apparatuses described above can be used as a substitute for the hardware.

The network printer control program will be simply called a printing control program in some cases. In each client, this printing control program includes programs for designating a change of the printing destination of a print job and a change of the printing order. In the print server, the printing control program includes programs for performing print job sequence control and notifying the end of a print job and a printing destination change request.

The printing control program of this embodiment for performing the above control can be divided into a module to be installed in each client and a module to be installed in the print server. One printing control program can also function as a program for a client or as a program for the print server, in accordance with the environment in which it is executed. Alternatively, it is also possible to install, in a single computer, both a module having the functions as a client and a module having the functions as the print server, and simultaneously or time-divisionally operate these modules in parallel in a pseudo manner.

Referring to FIG. 3, a basic I/O program 301 has, e.g., an IPL (Initial Program Loading) function of loading the OS from the HD 205 into the RAM 202 and starting the operation of the OS, when this control apparatus is powered on. An operating system (OS) 302 and a network printer control program 303 are stored in areas secured on the RAM 202. Related data 304 is stored in an area secured on the RAM 202. Furthermore, a work area 305 is used by the CPU 200 as a temporary data storage area and the like when the CPU 200 executes this printer control program.

Figure 4:
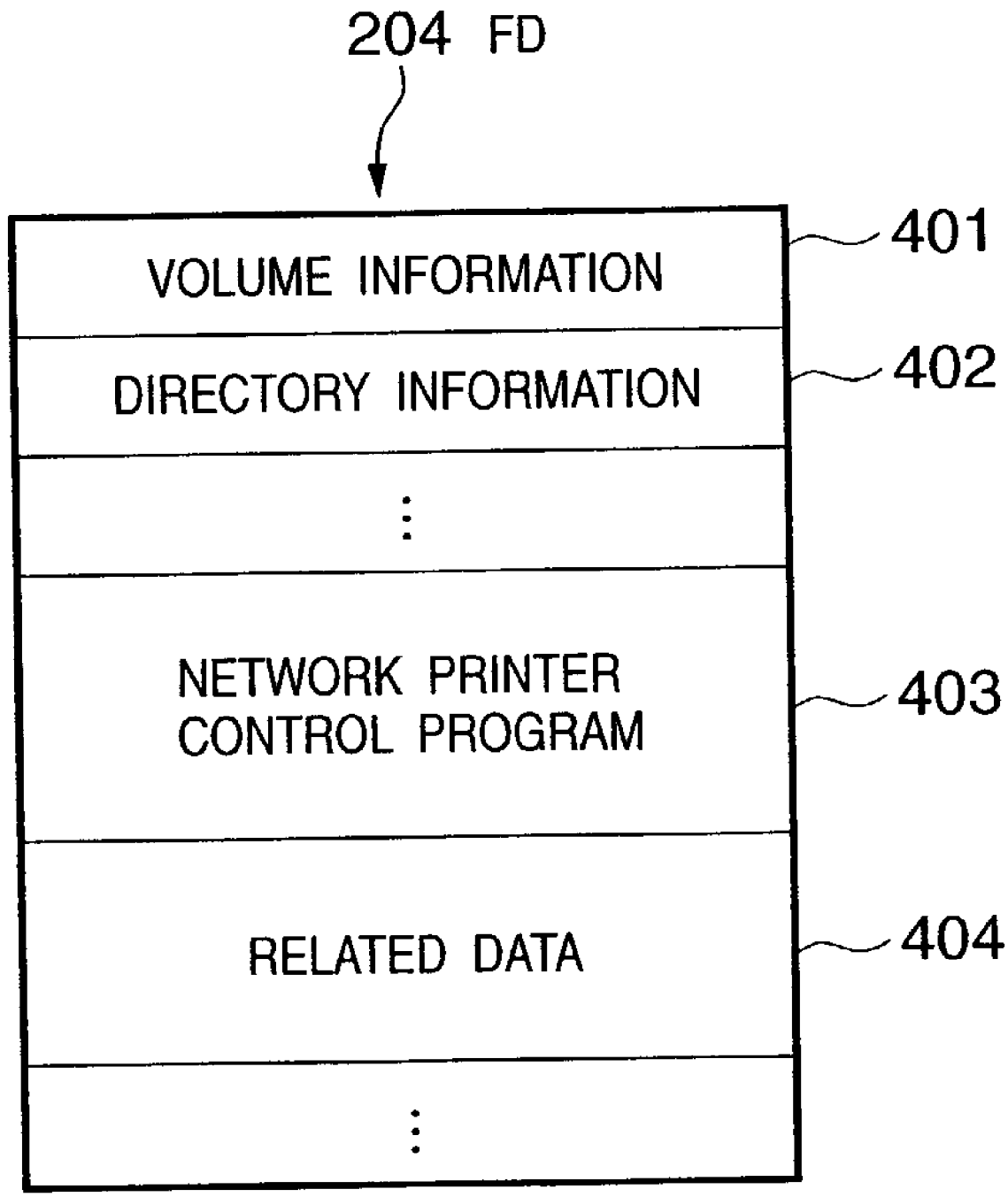
FIG. 4 is a view showing an example of a memory map in an FD 204 shown in FIG. 2.

FIG. 4 is a view showing an example of a memory map in the FD 204 shown in FIG. 2. Referring to FIG. 4, reference numeral 401 denotes volume information indicating the information of data; 402, directory information; 403, a network printer control program as the printing control program explained in this embodiment; and 404, related data of the network printer control program 403. This network printer control program 403 is formed on the basis of flow charts explained in this embodiment, and has the same configuration for both a client and the server in this embodiment.

FIG. 5 is a view showing the FD 204 inserted into the FD driver 203 shown in FIG. 2. The same reference numerals as in FIG. 2 denote the same parts in FIG. 5. As described above with reference to FIG. 4, the network printer control program explained in this embodiment and related data are stored in the FD 204.

The print job control system of this embodiment which performs a printing process such as distributed, broadcast, or print job redirecting printing by using a plurality of printers will be described below. In this embodiment, a plurality of printers are virtually bound as one printer called a group printer (virtual printer), and the individual bound printers are called member printers. Also, corresponding printer drivers are called a group printer driver and member printer driver. A member printer driver is software which generates PDL data interpretable by a printer, and a member printer has a predetermined port corresponding to the printer driver software.

Figure 6:
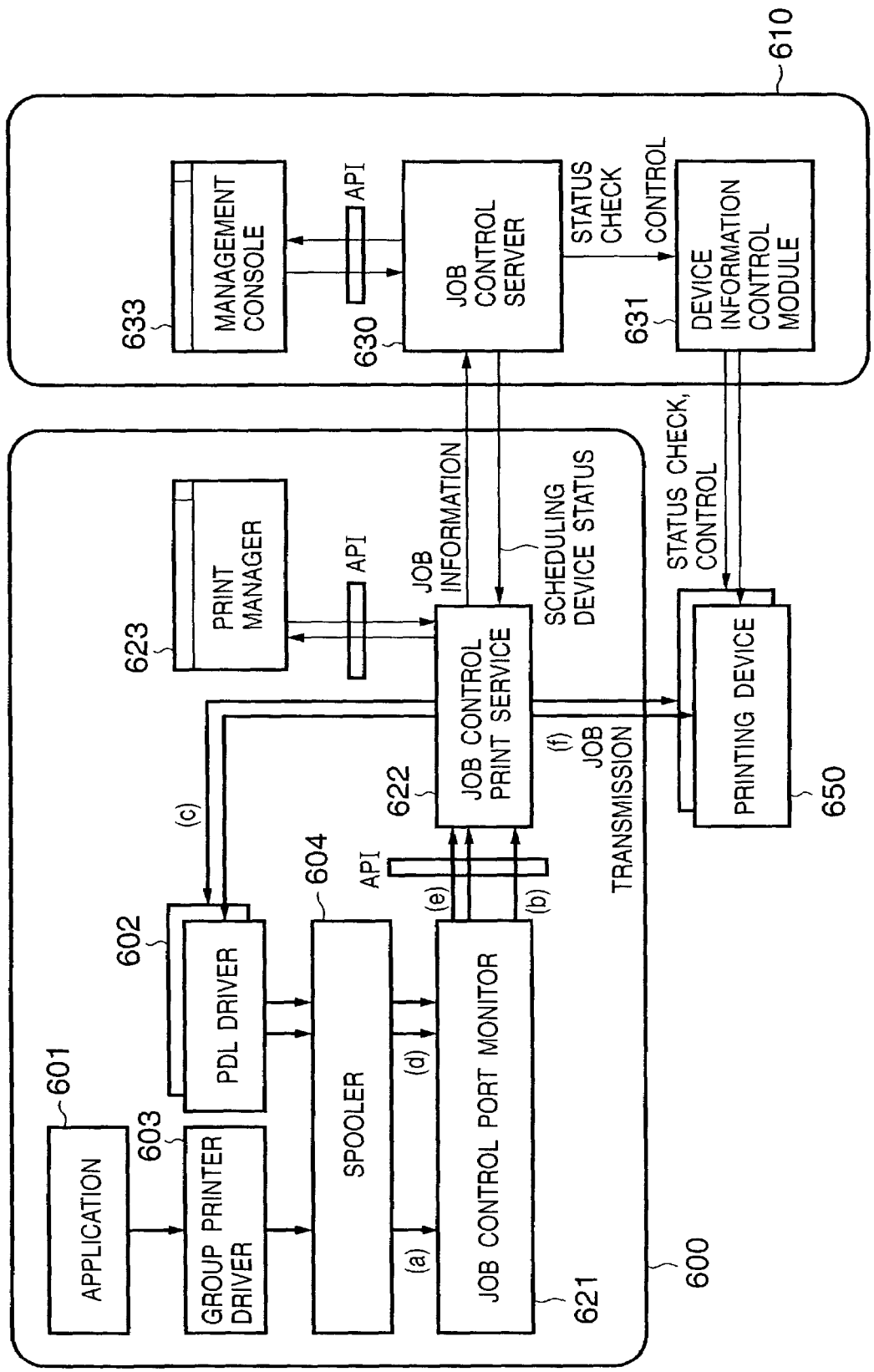
FIG. 6 is a block diagram showing the way a print job issued by an application in a client-server model of this system is processed in a print job control system.

FIG. 6 is a view showing the way a print job issued by a general application such as Microsoft Word (trademark) is processed in the print job control system in a client-server model of this system. In FIG. 6, a client computer 600 (corresponding to 102 to 104 in FIG. 1) is a machine in which the client module of the print job control system of this embodiment operates. Also, a print server 610 corresponds to 101 in FIG. 1.

Generally, when printing is designated, the application program generates a series of drawing commands (GDI functions), and these drawing commands (DDI functions) converted via the OS are transferred to the printer driver. On the basis of the input drawing commands from the OS, the printer driver generates a printer control language (PDL) interpretable by the printer. This printer control language is transferred as a print job (to be also referred to as print job data hereinafter) bound by JL (Job Language) to a print spooler (e.g., WindowsSpooler) provided by the OS. This print spooler follows the procedure in which the print job data is transferred to a port monitor selected by the user and transmitted to the printing device.

In contrast, in this embodiment the user designates printing by designating a print job control system port monitor 621 (to be abbreviated as a job control port monitor hereinafter) beforehand. An application program 601 receives the printing instruction and generates a series of drawing commands. A group printer driver 603 receives the drawing commands and generates a general-purpose printing file (to be described later). The group printer driver 603 transmits this general-purpose printing file as print job data to the job control port monitor 621, but not to a port monitor which transmits print job data to a printing device. In addition, the job control port monitor 621 transmits the print job data to a print job control system print service 622 (to be abbreviated as a job control print service hereinafter), but not to a printing device 650. The job control print server 622 performs print job control (to be described later) for the received print job data. Note that the print job data received by the job control print service 622 is not an actual print job but the general-purpose printing file as described above. As will be described later, a final print job is generated by control performed later.

A print job control system print manager 623 (to be abbreviated as a job control print manager hereinafter) is a program for providing a user interface (UI) by which the user checks the status of a print job in the job control print service 622 and operates the print job. The job control print manager 623 exchanges information and instructions with the job control print service 622 via the interface (API) of the software of this job control print service 622.

In the print server 610, a print job control system server 630 (to be abbreviated as a job control server hereinafter) performs centralized control (scheduling) for timings at which the job control print services 622 on the individual clients 600 transmit print job data to the printing devices 650. A print job control system management console 633 (to be abbreviated as a job control management console hereinafter) can monitor the whole print job control system by exchanging information and instructions with the job control server 630 via the API which the software of this job control server 630 accesses.

Also, the job control server 630 uses a device information control module 631 to communicate with each printing device 650, thereby acquiring information pertaining to a print job and the operating state of the printing device or operating the printing device. The acquired information can be transferred to the job control print service 622 of the client 600.

Printing from the group printer driver 603 in this embodiment will be explained below. The group printer driver 603 converts a series of drawing commands generated by the application program into a general-purpose printing file which has an intermediate format independent of the type of printing device. The format of this general-purpose printing file will be described later.

As described previously, this general-purpose printing file is transmitted from the spooler 604 to the job control port monitor 621(*a*) and to the job control print service 622(*b*). In accordance with the type of job control to be performed for this print job, the job control print service 622 generates a drawing command on the basis of the general-purpose printing file (c). The PDL driver 602 converts this drawing command into a PDL file interpretable by the printing device 650. Referring to FIG. 6, the job control print service 622 performs job control which divides this print job into two jobs. The two member jobs generated are indicated by two arrows (c). The PDL file generated by the PDL driver 602 is transferred from the spooler 604 to the job control port monitor 621(*d*) and to the job control print service 622 again (e). In accordance with instructions from the job control server 630, the job control print service 622 transmits the PDL print job data to the printing device 650(*f*).

In accordance with instructions of a printing designating document (a printing designating field to be described later with reference to FIG. 8, also called a job ticket) in the general-purpose printing file, the job control print service 622 logically divides one general-purpose printing file into a plurality of print jobs and transmits them to different printing devices, or retransmits once transmitted print job data to another printing device. (c), (d), (e), and (f) in FIG. 6 indicate paths of print job data in this case.

On the other hand, when application software forms a general-purpose printing file and directly supplies this general-purpose printing file as a print job, the way of transfer of information to the group printer driver 603 and the contents of processing in the group printer driver 603 are different from a general application.

As described above, to transfer drawing information to the group printer driver 603, a general application calls the GDI function of Windows OS (Windows is a registered trademark of Microsoft Corp., U.S.A.) as in the case of a common printer driver, and the group printer driver 603 generates a general-purpose printing file accordingly. In contrast, an application which directly forms a general-purpose printing file already has a general-purpose printing file and supplies this general-purpose printing file to the group printer driver 603. The group printer driver 603 rewrites, if necessary, the internal printing designating document of the general-purpose printing file on the basis of a preset printing method, and transfers the file to the spooler 604.

Figure 8:
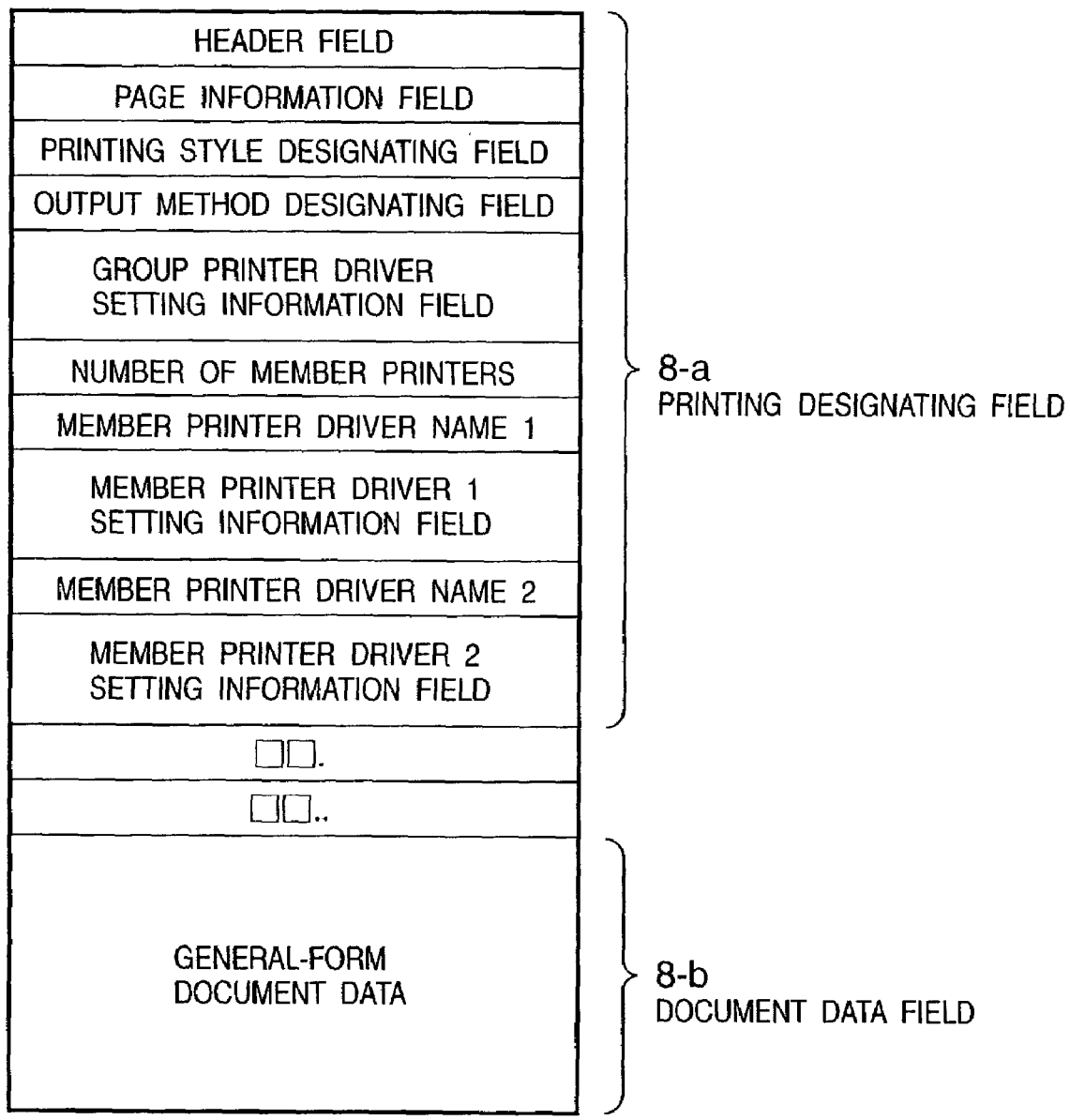
FIG. 8 is a view showing an example of the configuration of a general-purpose printing file.

FIG. 8 shows an example of the configuration of the general-purpose printing file. This general-purpose printing file used in this embodiment has a printing designating field 8-*a* and a document data field 8-*b*. The printing designating field 8-*a* describes document information and printing designation. The document data field 8-*b* converts document data of the application into general-form data, and has a data format independent of a printer language.

The printing designating field 8-*a* includes a header field, page information field, printing style designating field, output method designating field, group printer driver setting information field, the number of member printers (the number of member printer drivers), member printer driver names, and member printer driver setting information field. These fields will be explained below.

The "header field" stores information such as version identification of the file and file information. The "page information field" stores information such as the number of pages of document data in the document data field 8-*b*, and the size of each page. The "printing style designating field" stores information concerning the output style such as the range of pages to be printed, the number of copies, document data page layout information (N-UP or bookbinding printing), and staple designation or punch designation. The "output method designating field" stores information such as distributed printing, color-monochrome distributed printing, print job redirecting printing, and broadcast printing as output methods. The "group printer driver setting information field" stores printing setting information of the UI of the group printer driver (to be described later). The "number of member printers" stores the number of member printer drivers related by the group printer driver. The "member printer driver names" (identification information for identifying member printer drivers) stores the printer driver names of member printers. The "member printer driver setting information field" stores, e.g., DEVMODE information as printing setting information of the driver UI of a member printer driver. The "member printer driver names" and the "member printer driver setting information field" have storage areas corresponding to the number of member printers stored in the "number of member printers" described above.

To generate a general-purpose printing file, the group printer driver 603 explained with reference to FIG. 6 records the setting on the GUI provided by the group printer driver into the printing designating field 8-*a*. In addition, the group printer driver 603 converts data received from the application 603 by GDI into general-purpose data and records as document data in the document data field 8-*b* of this general-purpose printing file.

Note that the printing designating field 8-*a* and document data field 8-*b* of this general-purpose printing file can also be different files. In this case, the printing designating field exists as a printing designating document file, and the document data field exists as a document data file. These files can also be processed as a single file in the form of an archive.

The relationship between Print System provided by Windows and a print job in the print job control system and the contents of processing will be described in more detail below with reference to FIG. 7.

Figure 7:
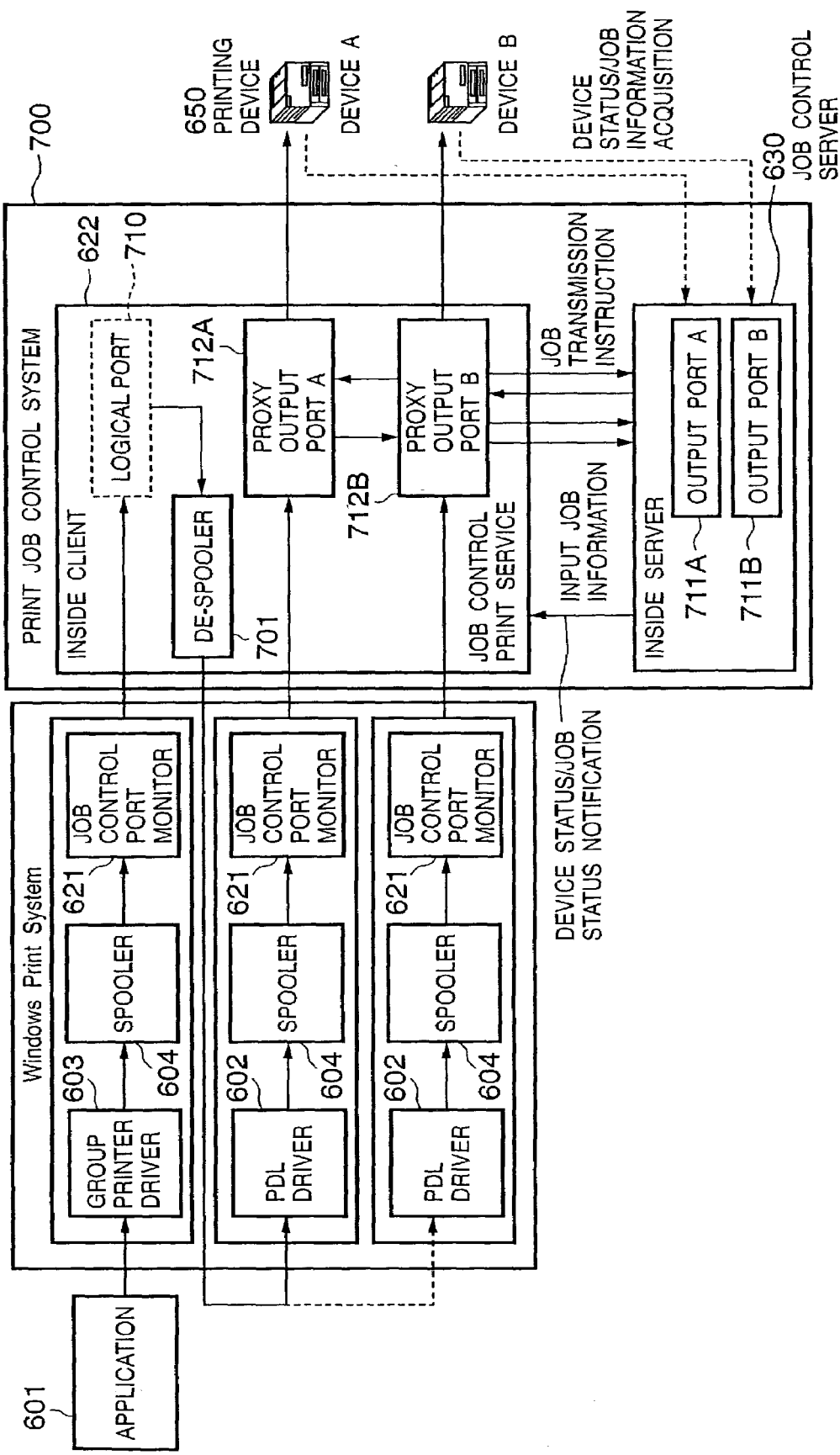
FIG. 7 is a block diagram showing details of the relationship between Print System provided by Windows (trademark) and a print job in the print job control system and details of the processing.

Referring to FIG. 7, a print job control system 700 indicates the range of a print job control system across a physical machine in which control programs of the server and client operate. Output ports 711A and 711B managed by the server are related to proxy output ports 712A and 712B of the job control print service 622 of the client, and all proxy output ports of clients related to one port are collectively managed. In this embodiment, actual print job data is held in the proxy output port 712 of each client. The job control server 630 does not transmit print job data itself, but only instructs the job control print service 622 to transmit a print job. In accordance with the instruction, the job control print service 622 of the client transmits print job data to the device 650.

Processing when the print job control system 700 performs value-added printing such as print job redirecting printing, distributed printing, or broadcast printing will be explained.

As described previously, when the print job control system 700 performs value-added printing such as print job redirecting printing, distributed printing, or broadcast printing, the user or the application 601 must issue a print job to a printer to which the group printer driver 603 is allocated. The job control print service 622 receives the job data processed by the group printer driver 603, as a general-purpose printing file, via the job control port monitor 621 and a logic port 710. Upon receiving this job, the job control print service 622 issues, via a de-spooler 701, a job (member job) to another printer to which the PDL driver 602 is allocated, and causes this printer to print the job.

That is, the de-spooler 701 interprets the printing designating field 8-*a* of the general-purpose printing file explained with reference to FIG. 8, converts document data in the document data field 8-*b* into the GDI of Windows, instructs each printer driver to perform printing, and issues a print job. For example, when designation of 2-UP is recorded in the printing style designating field, the de-spooler 701 lays out document data of two pages on a sheet of paper in a reduced scale. In distributed printing or broadcast printing, the de-spooler 701 issues jobs to a plurality of member printer drivers described in the printing designating field 8-*a,* in accordance with the setting of the printing. In print job redirecting printing, when the substitute conditions are met the de-spooler 701 issues a member job in accordance with previous setting in the case of automatic substitution or with a user's operation in the case of manual substitution.

When the de-spooler 701 is to issue a job to each member printer driver, DEVMODE (data describing driver setting information and the like) of each member printer driver must be formed as a printing instruction to the member printer driver. This DEVMODE is generated by properly reflecting the contents described in the printing designating field 8-*a* on DEVMODE of each member printer driver.

The job control print service 622 of the client receives PDL data of each member job, rendered by the PDL driver 602, via the job control port monitor 621, and notifies the server of information concerning the received job. In addition, the job control print service 622 temporarily holds the job data in the proxy output ports 712A and 712B. After that, the job control print service 622 receives a transmission instruction from the job control server 630 and transmits the held print job to the printing device 650.

Next, printer driver UI control for a print job control system which performs a printing process such as distributed, broadcast, or print job redirecting printing described above by using a plurality of printers corresponding to printer drivers according to this embodiment will be described below.

Figure 9:
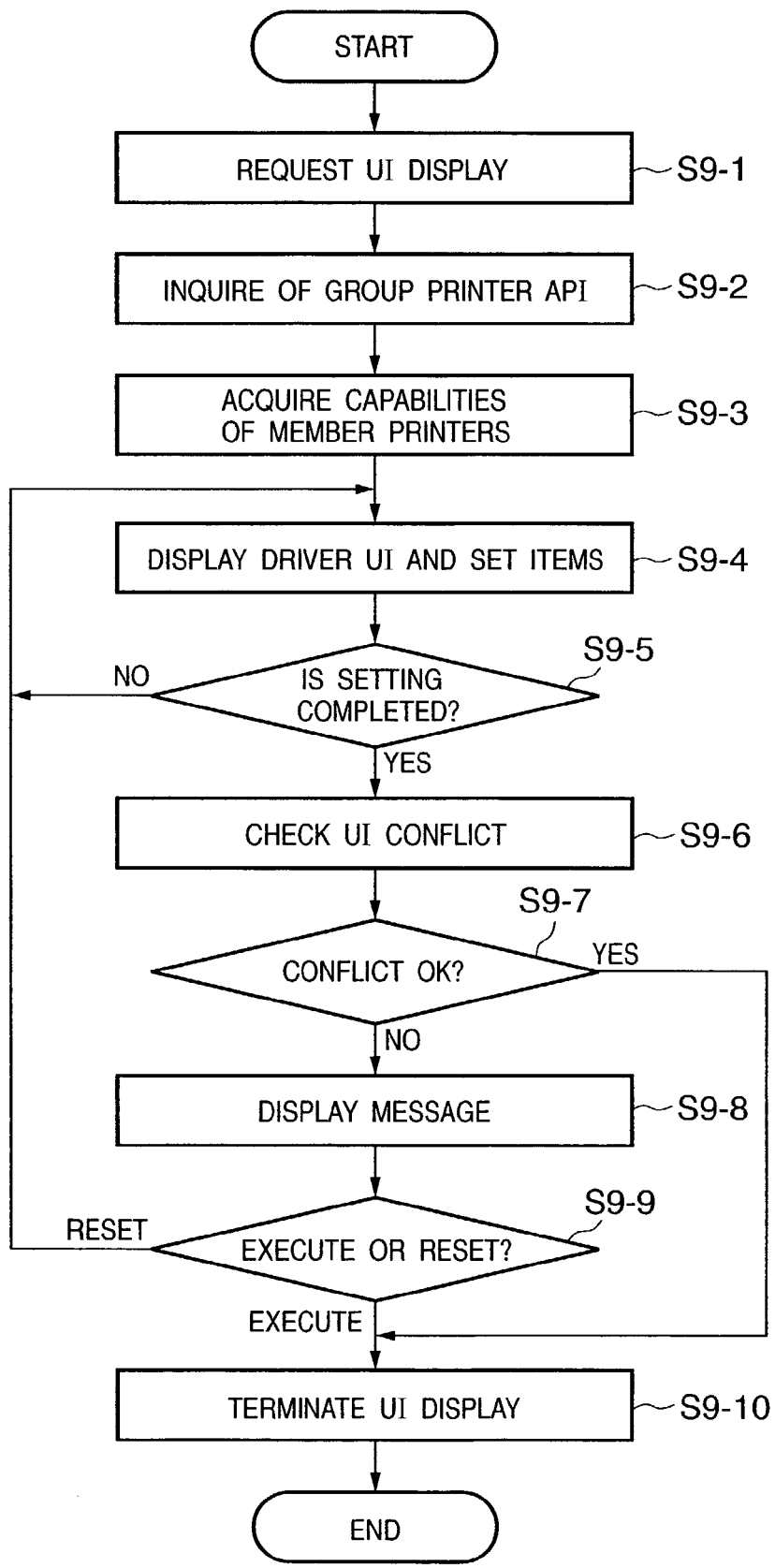
FIG. 9 is a flow chart showing a group printer driver UI control process according to this embodiment.

FIG. 9 is a flow chart showing the processing of group printer driver UI control according to this embodiment. When a UI display request is transmitted from an application 601 to a group printer driver 603, the group printer driver 603 receives this UI display request in step S9-1.

In step S9-2, the group printer driver 603 uses a print job control system API to inquire the IDs of member printer drivers constructing a group printer driver, thereby acquiring the IDs of all the member printer drivers constructing the group printer. The ID of a member printer driver will be explained in detail below. As the ID of a member printer driver in this embodiment, it is possible to use a name (text data) registered in an icon corresponding to a printer driver, identification information such as a serial number uniquely assigned to a printer driver, or identification information uniquely assigned to a management table of a registered printer driver. However, any information can be used, provided that each member printer driver can be specified by the information. This applies to other printer driver IDs in this embodiment. Note that a member printer driver is registered via the user interface of the group printer driver.

In step S9-3, the group printer driver 603 acquires the capabilities of each member printer driver in accordance with the ID of the member printer driver acquired in step S9-2. That is, the group printer driver 603 inquires of all the member printer drivers constructing the group printer driver 603 about their capabilities (setting items), and acquires the capabilities. FIG. 13 is a view showing examples of setting items which the group printer driver 603 inquires in step S9-3.

In step S9-4, the group printer driver 603 determines items to be displayed on the group printer driver UI, on the basis of the capabilities of the member printer drivers acquired in step S9-3, displays these items, and allows the user to set the items. This processing in step S9-4 will be described in detail below with reference to FIG. 10.

Figure 10:
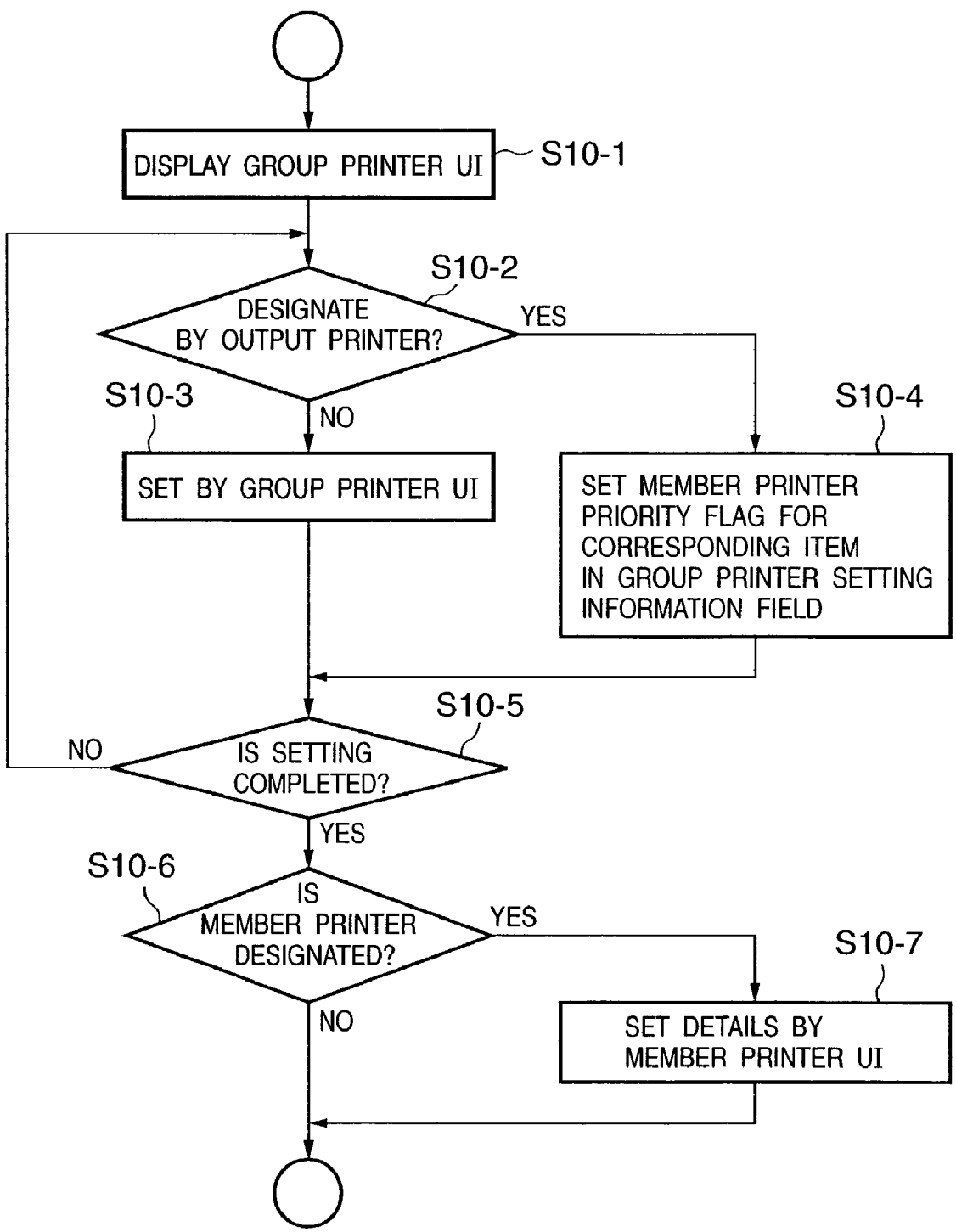
FIG. 10 is a flow chart showing details of a driver UI display and item setting process in step S9-4.

FIG. 10 is a flow chart showing details of the driver UI display and item setting process in step S9-4. In step S10-1, the group printer driver UI is displayed. In this step, function conflict processing is performed on the basis of the capabilities of each member printer driver, and the group printer driver UI is displayed on the basis of the result of the processing. The function conflict processing is to check whether the function of each setting item is "supported" or "not supported" by each member printer driver which belongs to the group printer. If all the member printer drivers as objects have a certain function, this function is processed as a settable item on the group printer driver UI. If even one of the member printer drivers as objects does not have a certain function, the corresponding item is processed as a non-settable item.

The UI control (function conflict processing) described above will be explained by taking a practical example. FIG. 14 is a view showing an example of the function conflict processing. A printer driver A in FIG. 14 represents a group printer driver. Printer drivers B, C, and D represent member printer drivers constructing the group printer driver. "Supported" and "not supported" in the table indicate whether each member printer driver supports a bookbinding printing function, staple printing function, and punch function.

Referring to FIG. 14, the drivers B and D have the bookbinding printing function, but the driver C has no such function, so the bookbinding printing function of the group printer driver A is "not supported". Likewise, since all the member printer drivers B, C, and D have the staple function, the staple function of the group printer driver A is "supported". Similarly, none of the member printer drivers B, C, and D has the punch function, the punch function of the group printer driver A is "not supported".

In steps S10-2 to S10-7 of FIG. 10, the user sets setting items found to be settable by the above conflict processing.

In step S10-2, whether "designate by output printer" (1501) as one setting item is designated is checked. If the item is designated, the flow advances to step S10-4. If the item is not designated, the flow advances to step S10-3. Note that this "designate by output printer" UI is provided for a setting item by which the group driver UI is complicated, and is used to intentionally make the setting of a member printer driver effective.

In step S10-3, setting is performed on the group printer driver UI. The contents set on the UI are set in corresponding items in a group printer setting information field in a printing designating field 8-*a* shown in FIG. 8. In step S10-4, processing is performed for an item for which "designate by output printer" is selected. That is, for an item for which "designate by output printer" is selected, a flag indicating "setting of output printer is given preference" is set in the corresponding item in the group printer setting information field. For an item in which this flag is set, a print job control system 700 outputs data by using the data in a member printer driver setting information field of each member printer driver in the printing designating field 8-*a* shown in FIG. 8.

Figure 15A:
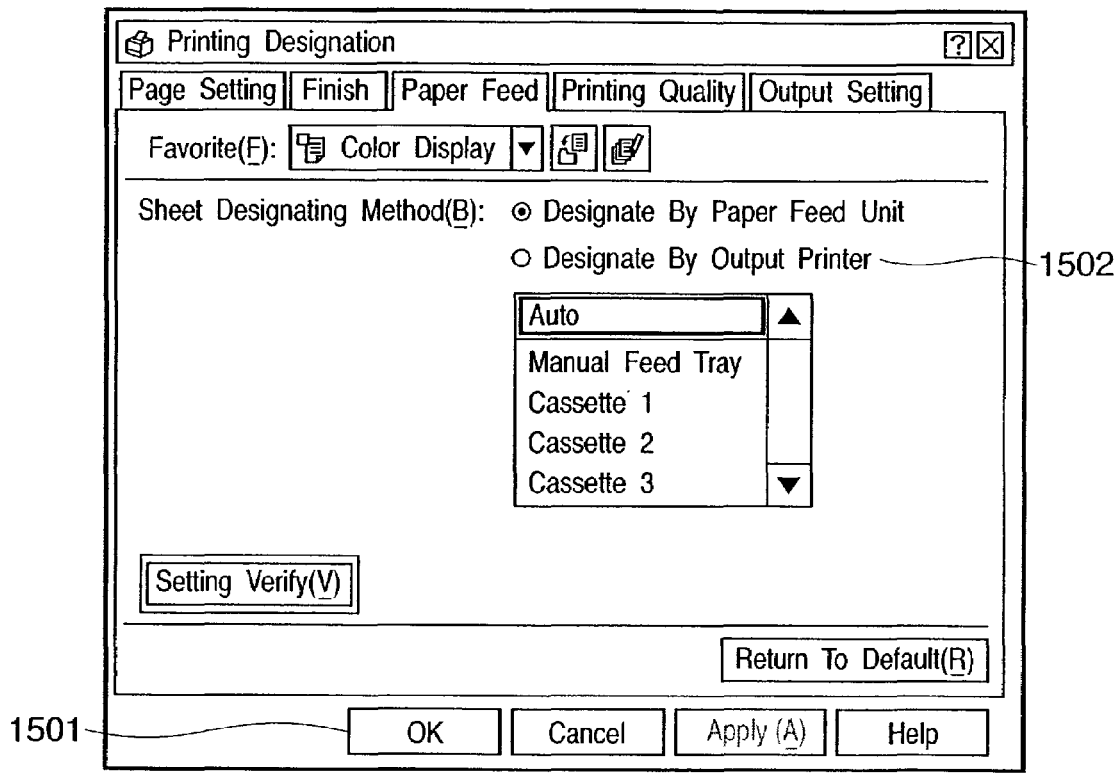
FIGS. 15A and 15B are views showing examples of UIs when "designate by output printer" is selected.
Figure 15B:
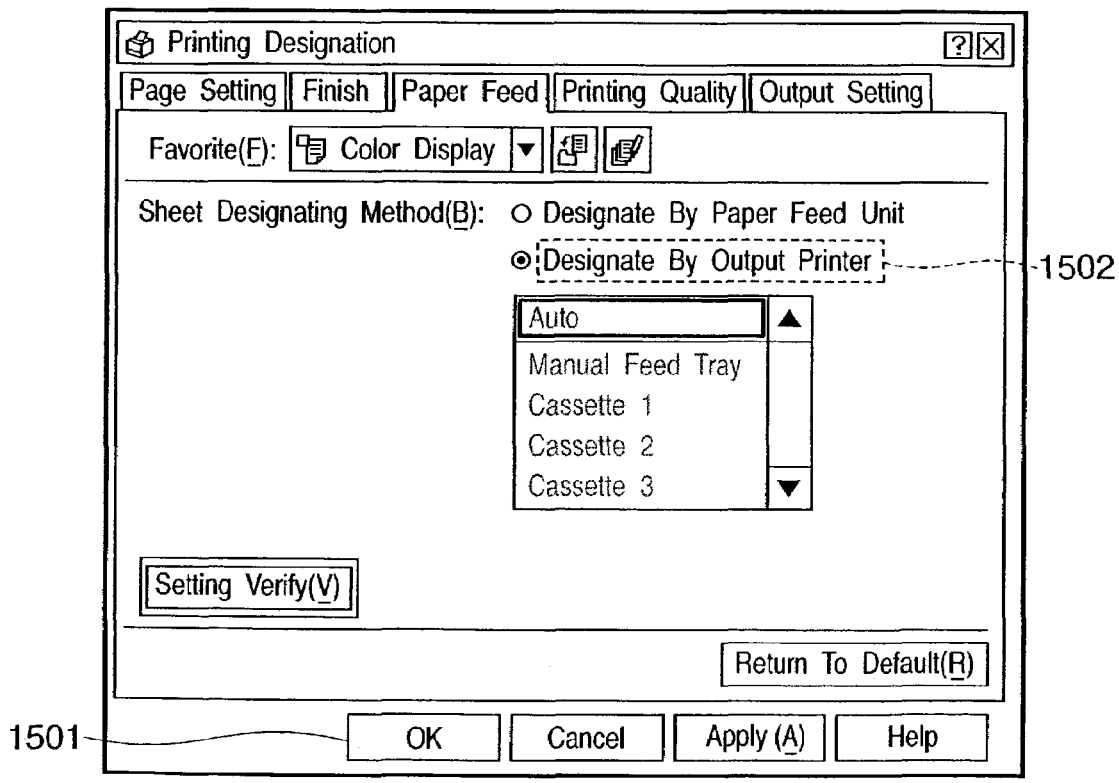

FIGS. 15A and 15B are views showing examples of group printer driver UI displays pertaining to designation of a paper feed unit. In these display examples, a paper feed port as one setting item settable from the group printer driver UI is set. Referring to FIG. 15A, "designate by paper feed unit" is selected, and a paper feed port can be set from the group printer driver UI. Printers have various numbers of paper feed ports, e.g., some printers have two paper feed ports and others have three. In the conflict processing described above, the numbers of paper feed ports of a plurality of member printers are ANDed to determine the range settable by the group printer driver. The UI is displayed so that a paper feed port can be set within this settable range, and this enables setting via the group printer driver.

On the other hand, if "designate by output printer" is selected as shown in FIG. 15B, this item cannot be set from the group printer driver UI any longer, and setting performed via the user interface of each member printer driver is made effective. For example, in the setting of a paper feed port shown in FIG. 15B, "auto, manual feed tray, cassette 1, cassette 2, and cassette 3" are grayed out and cannot be designated via a pointing device such as a mouse. In this case, a paper feed port can be set via the UI of each member printer driver. As described above, setting via the group printer UI and setting via the member printer driver can be switched as shown in FIGS. 15A and 15B. Accordingly, different printing environments can be flexibly controlled.

In particular, the number of paper feed ports of each member printer is in some cases not reflected owing to the conflict processing as described above, or the assignment of the IDs of paper feed ports sometimes changes from one printer to another. For example, cassette 1 indicates the lowermost cassette in one printer and the uppermost cassette in another printer. Therefore, a conflict may occur if this setting is solely performed by the group printer driver. Consequently, printing media are not necessarily supplied from a paper feed port intended by the user in all member printers corresponding to all member printer drivers.

In this embodiment as described above, setting can be performed via the group printer driver UI such that a paper feed port can be set for each individual member printer driver. Accordingly, the user can easily set a paper feed port whose ID changes from one printing device to another. Also, compared to a system in which functions are originally set via the user interface of each member printer driver, this printing control program (group printer driver) can extract items which must be individually set and, for these extracted items, can make the setting of each member printer driver effective. This can provide the user with an efficient member printer driver individual setting environment.

Although the setting pertaining to a paper feed port is explained above, the present invention is applicable to any items which must be individually set for each member printer driver (or items which can be set more efficiently in this way). Examples are other various printing setting items such as designation of a paper delivery port.

Note that the displays shown in FIGS. 15A and 15B are obtained by displaying, on the display unit via the OS, display information for displaying the user interface contained in the printing control program (including the group printer driver) of this embodiment. Other display contents in this embodiment are based on the same mechanism.

In step S10-5, the group printer driver 603 determines whether termination of the UI setting is designated by the user. This determination is done by checking whether an OK button 1501 of the UI is clicked. If termination is designated, the flow advances to step S10-6; if not, the flow returns to immediately before step S10-2 to continue the setting.

Steps S10-6 and S10-7 are processes for opening the UI of each member printer driver to set functions. When member printer driver designation is selected from the group printer driver UI, the flow advances from step S10-6 to step S10-7 to allow detailed setting on the member printer driver UI.

Figure 16:
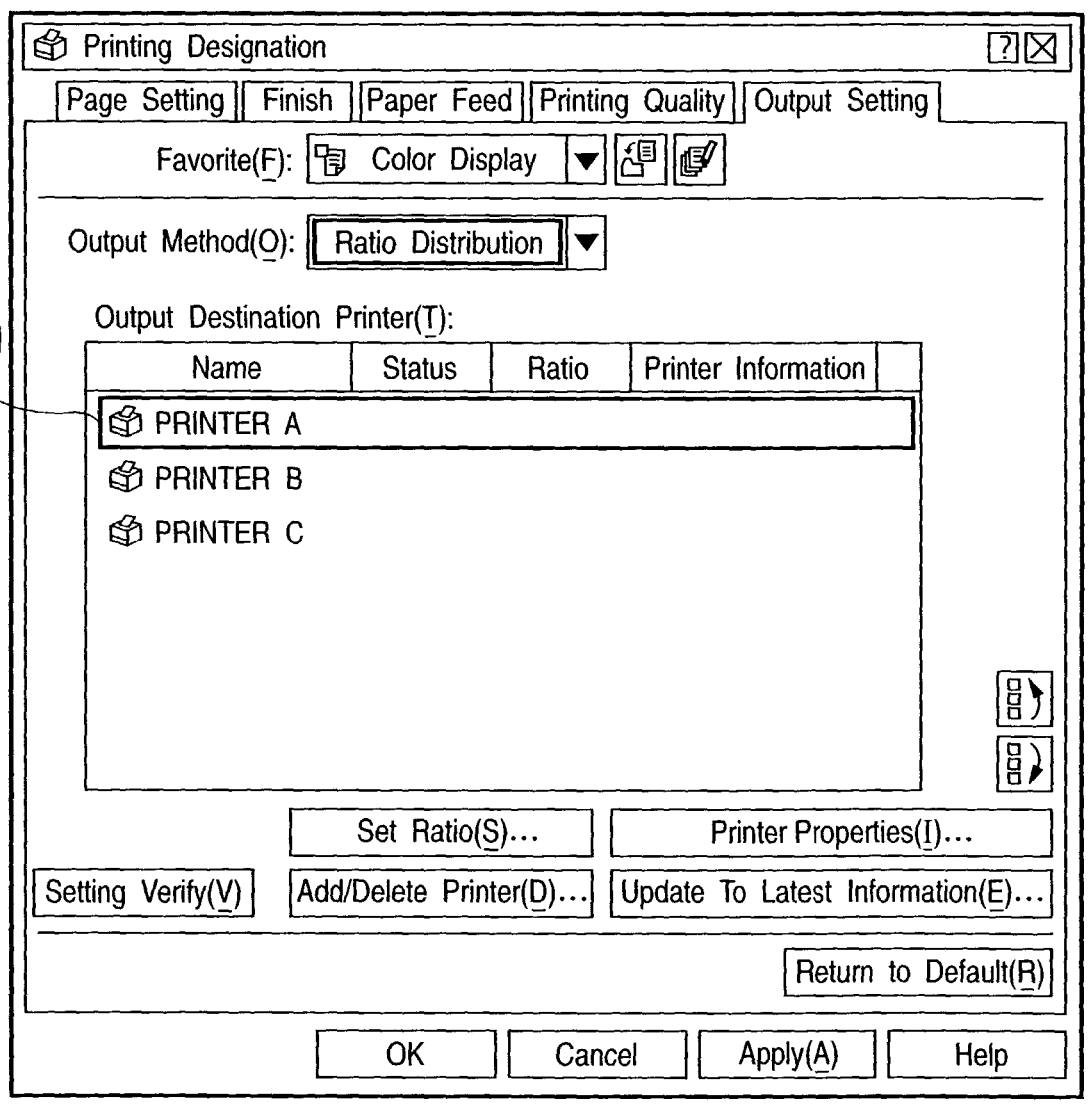
FIG. 16 is a view showing an example of a user interface for designating a member printer driver in step S10-6.

FIG. 16 is a view showing an example of the user interface for designating a member printer driver in step S10-6. FIG. 16 shows the state in which "PRINTER A" 1001 is selected. In a member printer driver which is not selected and in which no setting is changed, default values of this member printer driver are used for items for which "designate by output destination" is set.

Figure 11:
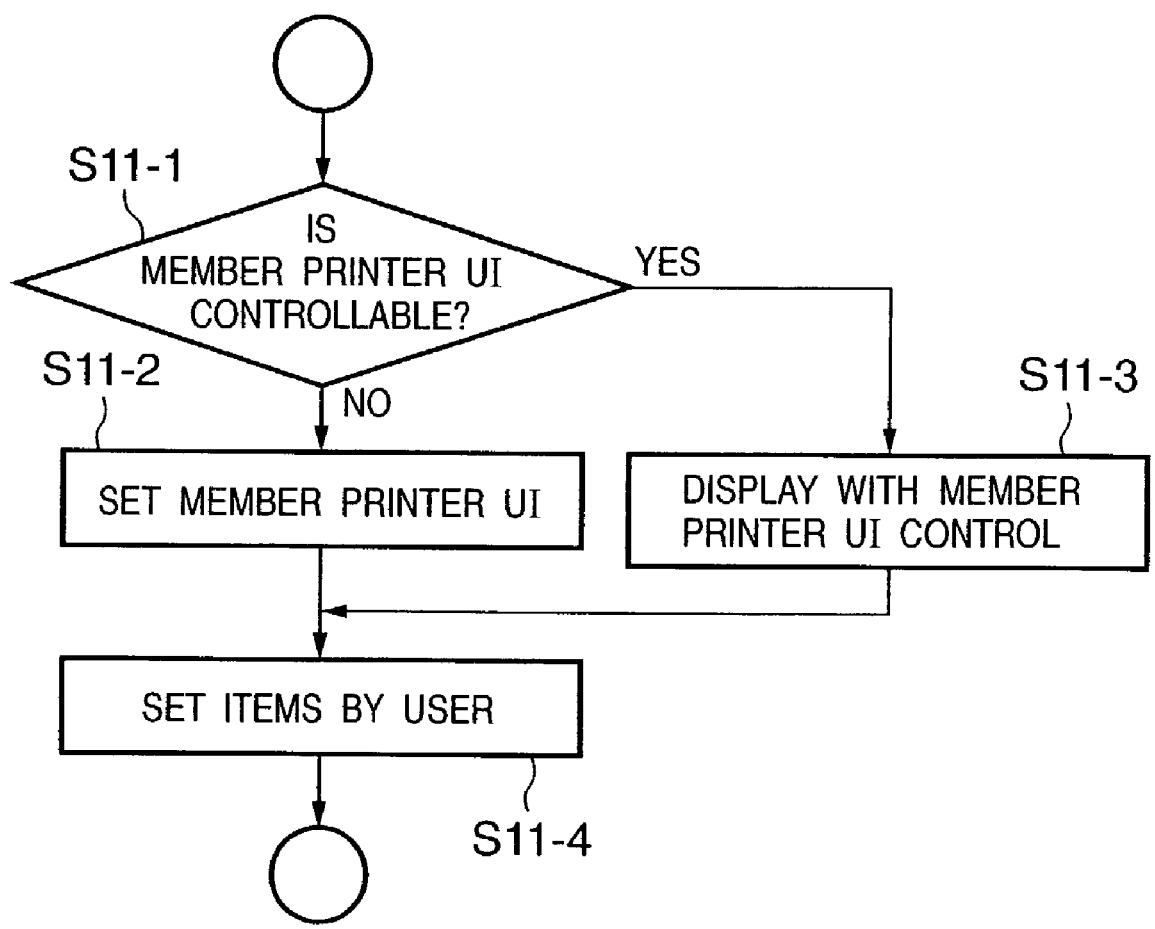
FIG. 11 is a flow chart showing details of a UI display process when a member printer driver UI is opened in step S10-7.

FIG. 11 is a flow chart showing details of step S10-7, i.e., showing a UT display process for opening a member printer driver UT. In step S11-1, type information (information such as the manufacturer and driver version) is acquired from the designated member printer driver. From this type information, whether the UI of the designated member printer driver can be controlled by the group printer driver is checked. For example, if the manufacturer name indicated by the designated type information indicates a manufacturer not supported by the group printer driver, the UI of this member printer driver cannot be controlled from the group printer driver. If the member printer driver is found to have a UT which cannot be controlled by the group printer driver, the flow advances to step S11-2, and the UT of this member printer driver is directly displayed. Note that in this embodiment, whether this UT control by the group printer driver is possible is determined using the type information such as the manufacturer and driver version. However, information for use in this type determination is not limited to the above information, so the determination can be performed by using another information. For example, the type can be determined by analyzing extended setting items and checking whether these items are interpretable.

Figure 12:
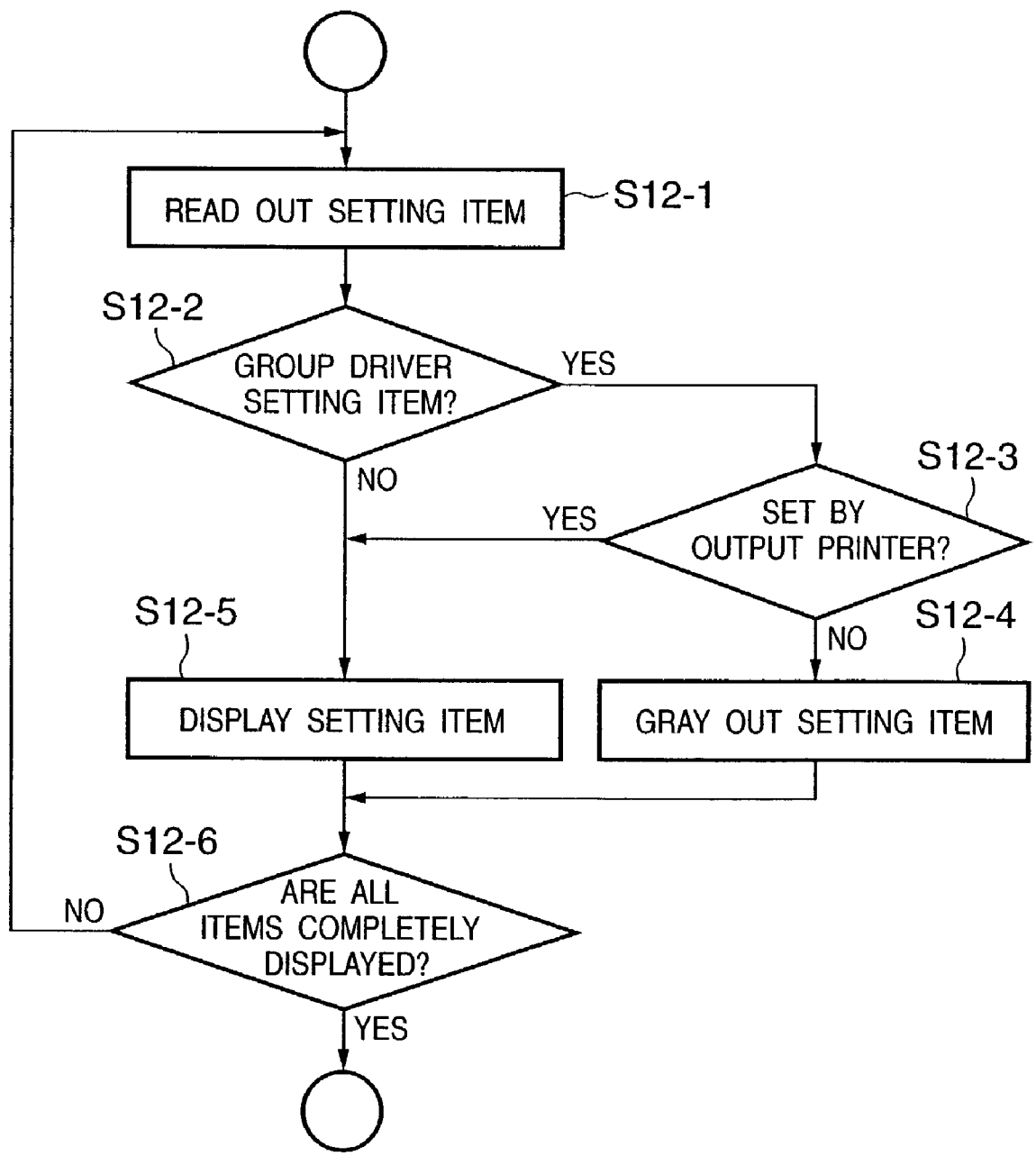
FIG. 12 is a flow chart showing details of step S11-3.

On the other hand, if UI control is possible, the flow advances to step S11-3. FIG. 12 is a flow chart showing details of step S11-3. In step S12-1, a displayed item of the driver UI is read out. After the displayed item is read out, the flow advances to step S12-2 to check whether the readout item is a setting item on the group printer driver UI. If this setting item is not a setting item of the group driver, the flow advances to step S12-5 to display the setting item.

If the setting item is a group driver setting item, the flow advances to step S12-3 to determine whether this item is selected as "set by output printer" on the group printer driver UI. This determination can be performed by checking whether the aforementioned flag indicating "setting of output printer is given preference" is set. If the item is selected as "set by output printer", the flow advances to step S12-5 to display the setting item. If it is determined in step S12-3 that this setting item is not selected as "set by output printer", the flow advances to step S12-4, and the setting item is grayed out or is not displayed at all so that the item cannot be set on the member printer driver UI. That is, a setting item which is a group driver setting item and which is not selected as "set by output printer" is a non-settable item and is grayed out or is not displayed at all.

Figure 17A:
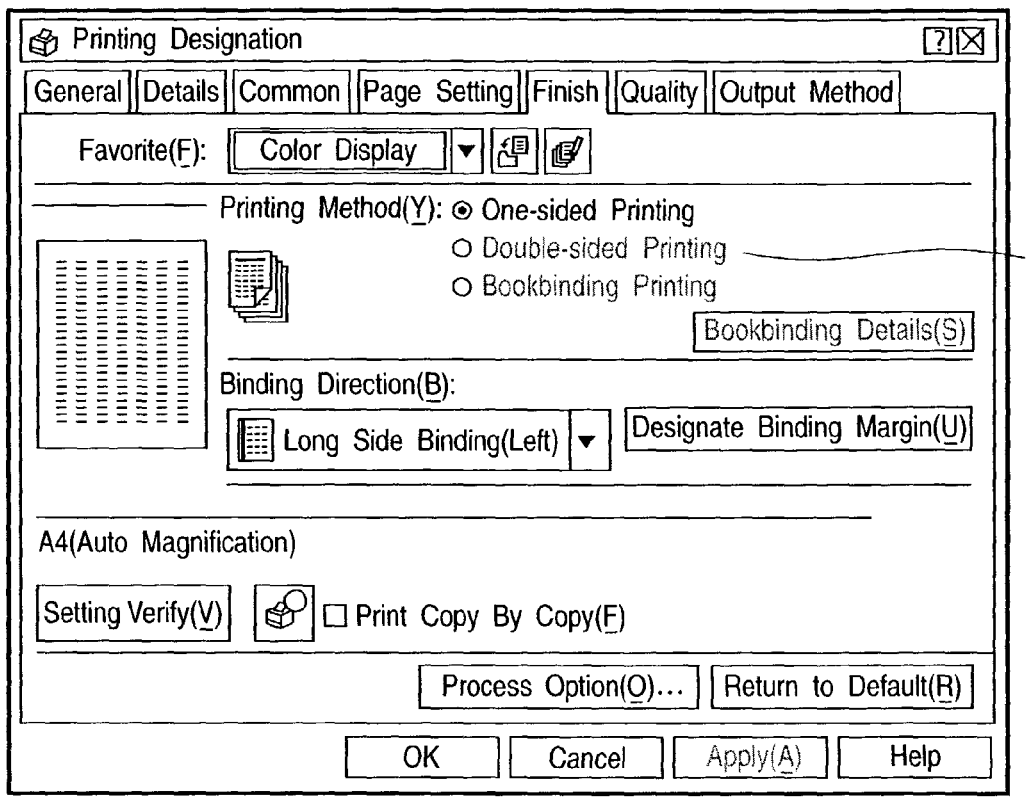
FIGS. 17A and 17B are views showing practical examples of states in which non-settable items are grayed out and are not displayed at all, respectively, in a member printer driver UI.

FIG. 17A is a view showing a practical example of the state in which non-settable items are grayed out (in FIG.

Figure 17B:
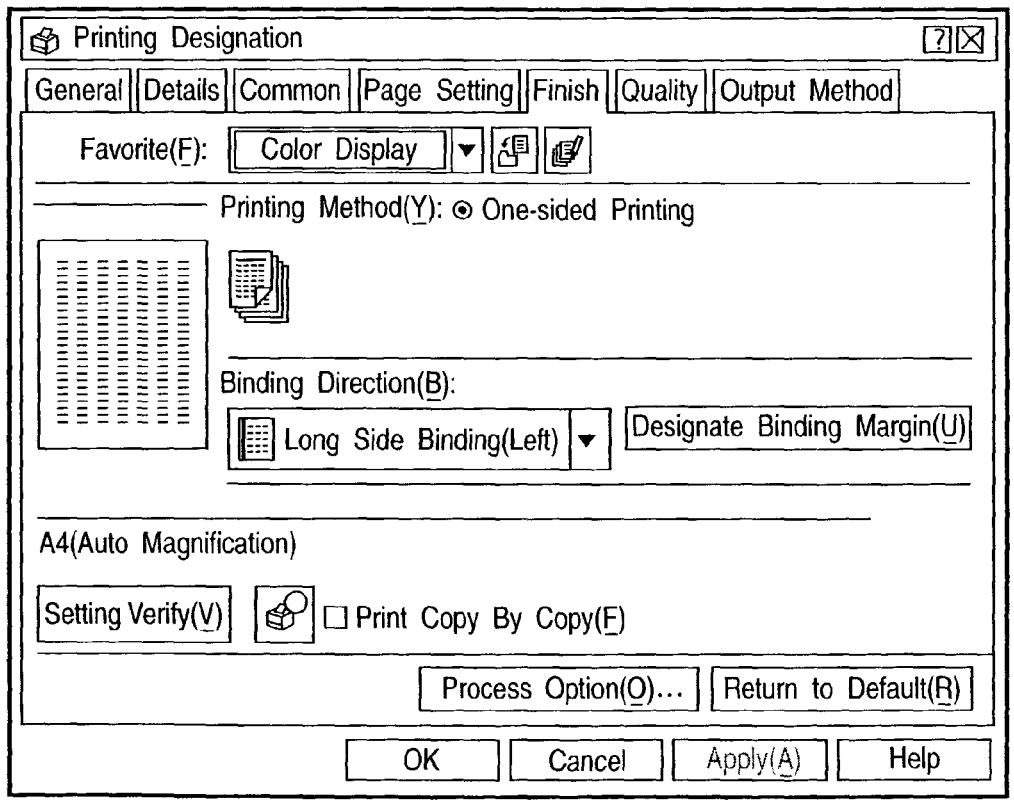

17A, double-sided printing, bookbinding printing, and bookbinding detail button indicated by 1701 are grayed out). FIG. 17B is a view showing a practical example of the state in which non-settable items are not displayed at all (the grayout portion (1701) shown in FIG. 17A is not displayed at all). The dialogue box of double-sided printing and bookbinding printing as setting items is a portion subjected to the UI control described above. If items already set by the group printer driver can also be set when the member printer driver UI is opened, the processing is duplicated if the same function is set by the two drivers. The above member printer driver UI control concerning non-settable items prevents this inconvenience.

In step S12-6, whether all setting items are completely displayed is checked. If NO in step S12-6, the flow returns to step S12-1 to continue the processing to display other setting items by UI control. If all setting items are completely displayed, the processing shown in FIG. 12 is terminated, and the flow advances to step S11-4.

In step S11-4, items which can be set by the user by using the member printer driver UI are set, and the processing shown in FIG. 11 is terminated when setting termination is designated. This setting termination designation is generally done by detecting clicking of the OK button shown in FIGS. 17A and 17B.

When the processing shown in FIG. 11 is completed, the flow advances to step S9-5 in FIG. 9. In step S9-5, whether all the setting is completed on the group printer driver UI is determined by checking whether the OK button indicating setting completion is clicked. If setting completion is not designated, the flow returns to step S9-4 to repeat the above processing. If setting completion is designated, the flow advances to step S9-6 to check whether the items set by the group printer do not conflict with the setting items of each member printer driver.

That is, printers have items closely related to the functions of these devices. Examples are:

In printer A, A4 sheets can be stapled only at the upper left corner.

In printer B, A4 sheets can be stapled only at the lower left corner.

In step S9-6, therefore, whether the items set on the group printer driver UI can be reflected as setting items of each member printer driver is determined by checking each member printer driver.

If it is determined by the conflict check performed in step S9-6 that the items set on the group printer driver UI are valid for all the member printer drivers, the flow advances from step S9-7 to S9-10 to terminate the display of the group printer driver UI. If it is determined in step S9-7 that there is a setting item by which a conflict occurs, the flow advances to step S9-8 to display a message "reset the setting item on the group printer driver UI or perform printing with the present setting item" and display a reset button and execute button on the UI.

In step S9-9, which of the reset button or execute button is clicked is checked. If the reset button is clicked, the flow returns to step S9-4 to reset the setting item. If the execute button is clicked, the flow advances to step S9-10 to terminate the display of the group printer driver UI.

The relationship between recording of the information set on the UI described above and the general-purpose printing file shown in FIG. 8 will be explained below. In this embodiment, of the information set on the above-mentioned UI, the driver setting information (DEVMODE) of the group printer driver is recorded in the printing designating field 8-*a* in the general-purpose printing file explained with reference to FIG. 8. Also, the driver setting information (DEVMODE) of each member printer driver is recorded in a corresponding member printer driver information setting field in the general-purpose printing file. After that, this general-purpose printing file is used in a printing process using the printing job control system described above, so printing of this embodiment can be performed.

In this embodiment as explained above, in a print job control system using a group printer driver, only representative setting contents of member printer driver setting items which have complicated setting contents and change from one printer type to another are set by a representative printer, and other setting contents are intentionally set by each member printer driver by using a button for the purpose. Since items to be set by each member printer driver can be intentionally designated, the display contents of the group printer are not complicated. In addition, detailed contents can be set by each member printer driver. Consequently, a better printing means which greatly improves the operability for users can be provided.

The object of the present invention can also be achieved by supplying a storage medium storing program codes of software for implementing the functions of the above embodiments to a system or apparatus, and reading out and executing the program codes stored in the storage medium by a computer (or a CPU or MPU) of the system or apparatus.

In this case, the program codes read out from the storage medium implement the functions of the present invention, and the storage medium storing these program codes constitutes the invention.

As this storage medium for supplying the program codes, it is possible to use, e.g., a floppy disk, hard disk, optical disk, magnetooptical disk, CD-ROM, CD-R, magnetic tape, nonvolatile memory card, and ROM.

Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension board inserted into the computer or of a function extension unit connected to the computer, and, in accordance with designations by the program codes, a CPU or the like of the function extension board or function extension unit performs part or the whole of actual processing and thereby implements the functions of the above embodiments.

As has been described above, the present invention can provide a user interface capable of efficiently and easily setting functions of a plurality of printers.

As many apparently widely different embodiments of the present invention can be made without departing from the spirit and scope thereof, it is to be understood that the invention is not limited to the specific embodiments thereof except as defined in the claims.

What is claimed is:

1. A printing system for using a plurality of printer drivers and issuing a plurality of print jobs to a plurality of printers corresponding to the plurality of printer drivers, said system comprising:

a first display control unit configured to control the display of a first user interface in which a common print setting, which is common to the plurality of the printer drivers, can be collectively set;

a second display control unit configured to control the display of an individual user interface specific to a printer driver designated from the plurality of printer drivers;

an issue control unit configured to, when issuing the plurality of print jobs, issue a print job to a printer corresponding to the designated printer driver based on print settings which are set by using the first user interface and the individual user interface, and to issue a print job to another of the plurality of printers based on print settings which are set by using the first user interface without using an individual user interface; and a determining unit configured to determine a type of the designated printer driver, wherein said second display control unit changes a form of presentation of the individual user interface, in accordance with the determination result from said determining unit, wherein said determining unit determines whether the display contents of the individual user interface of the designated printer driver can be controlled by said second display control unit and controls to change a form of presentation of the individual user interface in accordance with the determination result from said determining unit, and wherein if said determining unit determines that the display contents are controllable, said second display control unit controls to display the individual user interface as an interface by which setting items to be set by the first user interface are not set.

2. A printing system for using a plurality of printer drivers and issuing a plurality of print jobs to a plurality of printers corresponding to the plurality of printer drivers, said system comprising:

a first display control unit configured to control the display of a first user interface in which a common print setting, which is common to the plurality of the printer drivers, can be collectively set;

a second display control unit configured to control the display of an individual user interface specific to a printer driver designated from the plurality of printer drivers;

an issue control unit configured to, when issuing the plurality of print jobs, issue a print job to a printer corresponding to the designated printer driver based on print settings which are set by using the first user interface and the individual user interface, and to issue a print job to another of the plurality of printers based on print settings which are set by using the first user interface without using an individual user interface; and a setting unit which, for a predetermined setting item, sets information as to which setting, a setting by the first user interface or a setting by the individual user interface, is made effective.

3. The system according to claim 2, wherein the predetermined setting item to be set includes setting of a paper feed port.

4. The system according to claim 2, further comprising a unit which, if said setting unit sets such that the setting of a predetermined setting item by the individual user interface is made effective, makes the display of the predetermined setting item on the first user interface ineffective.

5. A print data processing method including print setting processing for a plurality of print jobs issued via a plurality of printer drivers, said method comprising:

a first display control step of controlling the display of a first user interface in which a common print setting, which is common among the plurality of the printer drivers, can be collectively set;

a second display control step of controlling the display of an individual user interface specific to a printer driver designated from the plurality of printer drivers;

an issue control step of, when issuing the plurality of printer jobs, issuing a print job to a printer corresponding to the designated printer driver based on print settings which are set by using the first user interface and the individual user interface, and issuing a print job to another of the plurality of printers based on print settings which are set by using the first user interface without using an individual user interface; and a determination step of determining a type of the designated printer driver, wherein, in the second display control step, a form of presentation of the individual user interface is changed in accordance with the determination result in the determination step, wherein, in the determination step, it is determined whether the display contents of the individual user interface of the designated printer driver can be controlled in the second display control step, and a form of presentation of the individual user interface is changed in accordance with the determination result obtained in the determining step, and wherein, if it is determined in the determination step that the display contents are controllable, in the second display control step the individual user interface is displayed as an interface by which setting items to be set by the first user interface are not set.

6. A print data processing method including print setting processing for a plurality of print jobs issued via a plurality of printer drivers, said method comprising:

a first display control step of controlling the display of a first user interface in which a common print setting, which is common among the plurality of the printer drivers, can be collectively set;

a second display control step of controlling the display of an individual user interface specific to a printer driver designated from the plurality of printer drivers;

an issue control step of, when issuing the plurality of printer jobs, issuing a print job to a printer corresponding to the designated printer driver based on print settings which are set by using the first user interface and the individual user interface, and issuing a print job to another of the plurality of printers based on print settings which are set by using the first user interface without using an individual user interface; and a setting step of, for a predetermined setting item, setting information as to which setting, a setting by the first user interface or a setting by the individual user interface, is made effective.

7. The method according to claim 6, wherein the predetermined setting item to be set includes setting of a paper feed port.

8. The method according to claim 6, further comprising the step of, if the setting step sets such that the setting of a predetermined setting item by the individual user interface is made effective, making the display of the predetermined setting items on the first user interface ineffective.

9. A printing system for using a plurality of printer drivers and issuing a plurality of print jobs to a plurality of printers corresponding to the plurality of printer drivers, said system comprising:

a first display control unit configured to control the display of a first user interface in which a common print setting, which is common to the plurality of the printer drivers, can be collectively set;

a second display control unit configured to control the display of an individual user interface specific to a printer driver designated from the plurality of printer drivers; and an issue control unit configured to, when issuing the plurality of print jobs, issue a print job to a printer corresponding to the designated printer driver based on print settings which are set by using the first user interface and the individual user interface, and to issue a print job to another of the plurality of printers based on print setting which are set by using the first user interface without using an individual user interface, wherein, in the individual user interface, a setting item to be set by the first user interface is not available.

10. A print data processing method including print setting processing for a plurality of print jobs issued via a plurality of printer drivers, said method comprising:

a first display control step of controlling the display of a first user interface in which a common print setting, which is common among the plurality of the printer drivers, can be collectively set;

a second display control step of controlling the display of an individual user interface specific to a printer driver designated from the plurality of printer drivers; and an issue control step of, when issuing the plurality of printer jobs, issuing a print job to a printer corresponding to the designated printer driver based on print settings which are set by using the first user interface and the individual user interface, and issuing a print job to another of the plurality of printers based on print settings which are set by using the first user interface without using an individual user interface.

wherein, in the individual user interface, a setting item to be set by the first user interface is not available.

* * * * *

UNITED STATES PATENT AND TRADEMARK OFFICE
CERTIFICATE OF CORRECTION

PATENT NO. : 7,102,783 B2
APPLICATION NO. : 10/238649
DATED : September 5, 2006
INVENTOR(S) : Hidekazu Morooka et al.

It is certified that error appears in the above-identified patent and that said Letters Patent is hereby corrected as shown below:

ON THE TITLE PAGE AT ITEM (56), Foreign Patent Documents:
"2001-1956166" should read --2001-195166--.

COLUMN 11:
Line 26, "cut" should read --out--.

COLUMN 12:
Line 21, "UT" should read --UI--.
Line 22, "UT" should read --UI--.
Line 31, "UT" should read --UI--.
Line 33, "UT" should read --UI--.
Line 35, "UT" should read --UI--.

COLUMN 17:
Line 15, "setting" should read --settings--.

COLUMN 18:
Line 15, "interface." should read --interface,--.

Signed and Sealed this

First Day of May, 2007

JON W. DUDAS
*Director of the United States Patent and Trademark Office*